June 23, 1970  R. N. MONTOYA  3,516,505

SCALE BEAM AND POISE

Filed Feb. 1, 1968  2 Sheets-Sheet 1

INVENTOR.
Ralph N. Montoya

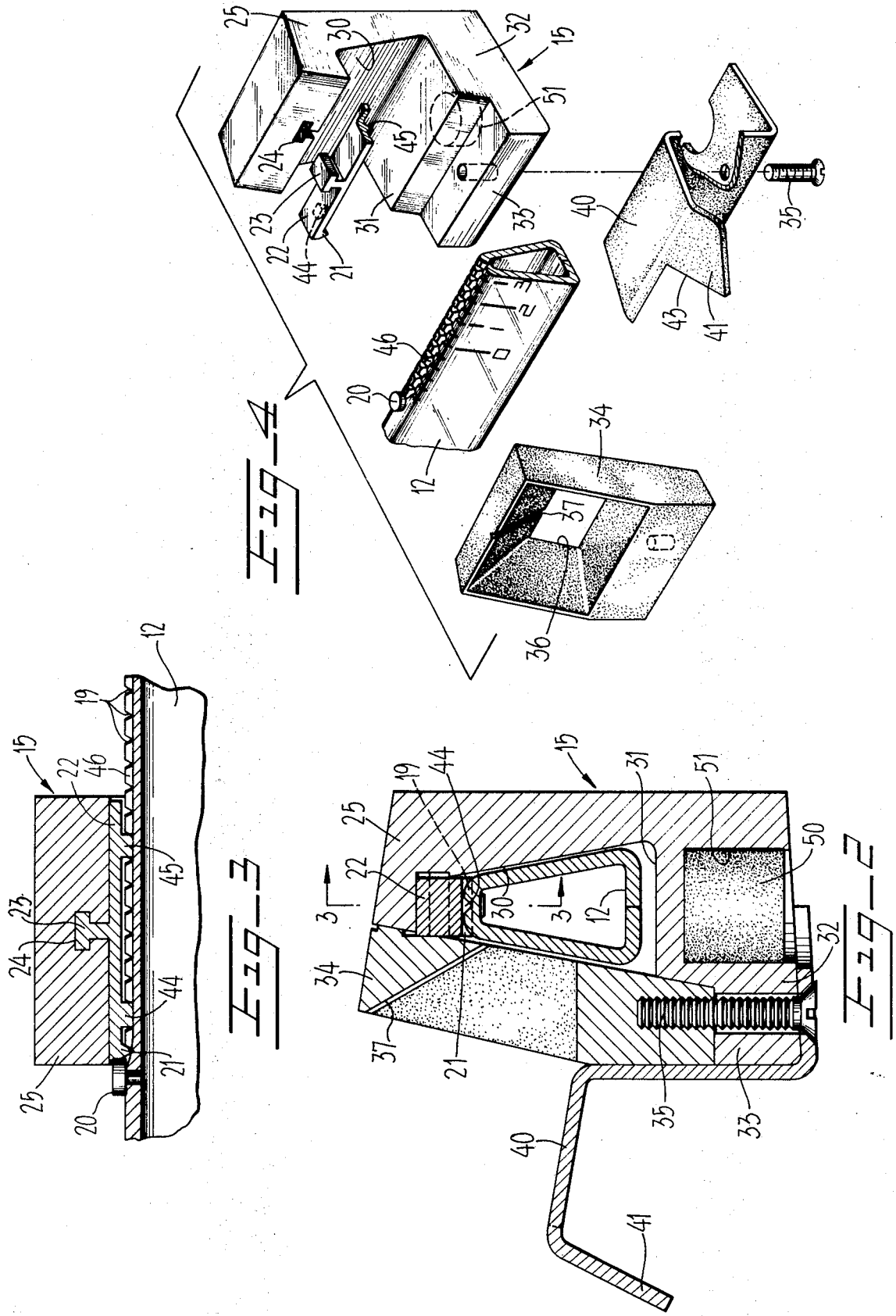

United States Patent Office 3,516,505
Patented June 23, 1970

3,516,505
SCALE BEAM AND POISE
Ralph N. Montoya, Castro Valley, Calif., assignor to The Singer Company, a corporation of Delaware
Filed Feb. 1, 1968, Ser. No. 702,465
Int. Cl. G01g 1/36
U.S. Cl. 177—44
1 Claim

ABSTRACT OF THE DISCLOSURE

This invention relates to the scale beam and poise of a postal scale, and more particularly to an improvement for lending lateral stability to the poise during and after adjustment of the poise along the beam.

BACKGROUND OF THE INVENTION

There are weigh scales in use today which are provided with fee charts for indicating a charge for a commodity by weight, as determined by the adjustment of the poise on the scale beam. In many instances, such scales are small and fairly simple in construction. One such type of scale is utilized to determine the amount of postage required for letters, small packages or other such mail matter, ascertained by the adjustment of a loosely-fitted poise. For the weighing of such items, the weight graduations on the scale beam are usually in ounces and fractions thereof, which makes it necessary that the value indications on the fee chart be closely adjacent, each to the others. Unless extreme care is exercised in the adjustment of the poise, to be certain it is accurately seated in the appropriate notch in the scale beam, lateral displacement of one end or the other of the poise is possible, thereby indicating an erroneous feed requirement on the chart.

SUMMARY OF THE INVENTION

In the present invention, the poise is moved along the length of the scale beam to the correct counterbalanced position, wherein the indexing tooth of the poise is seated in the corresponding transverse notch in the scale beam. Thus, the poise is removably retained in each adjusted position by virtue of its weight, and the required fee for the weighed article is indicated on a chart. In a situation where the fee or charge for an article such as a letter is based on the weight of the article in ounces, it is necessary that each of the indicated values or fees be completely legible and only slightly spaced from adjacent values on the chart. Due to the narrow spacing between the indicated values, any misalignment of the poise on the scale beam may indicate an erroneous value. It is, therefore, an object of the invention to provide means for maintaining the poise in accurate alignment lengthwise of the scale beam.

Other objects and advantages will appear from the following description of a preferred embodiment as illustrated in the accompanying drawings in which:

FIG. 2 is a cross-sectional view of the poise and scale beam;

FIG. 3 is a fragmentary sectional view of the poise and scale beam taken on the plane indicated by lines 3—3 in FIG. 2; and FIG. 4 is an isometric projection, showing the poise assembly.

Figure 1:
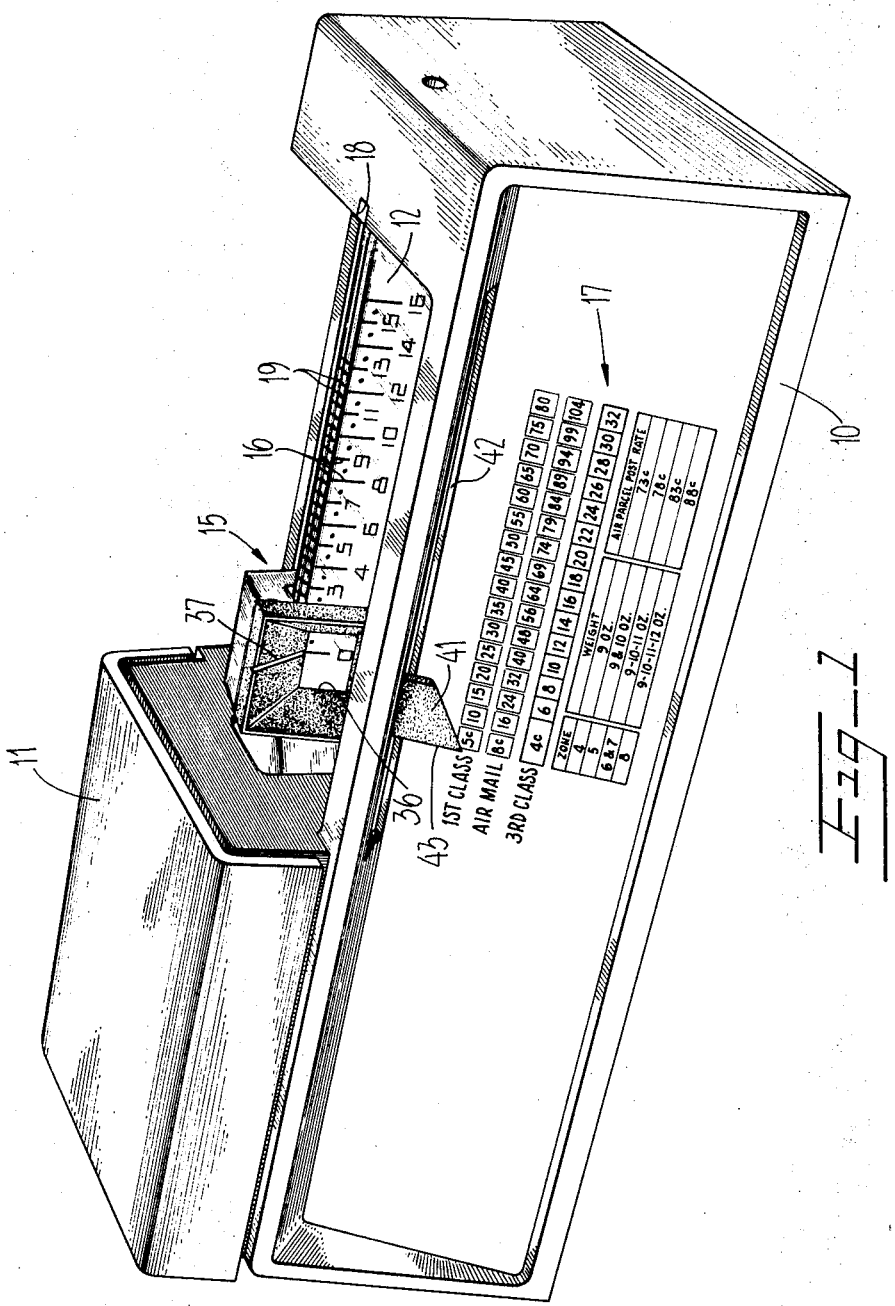
FIG. 1 is a view in perspective of the postal scales.

The invention is shown as embodied in a conventional weigh scale for ascertaining the weight of various pieces of mail matter, such as letters, small packages, or the like.

As seen in FIG. 1, such a weigh scale comprises the housing casting 10, platform 11, upon which articles to be weighed are placed, scale beam 12 and poise 15 adjustably mounted on the scale beam. Weight graduations in ounces are engraved, or otherwise indicated, on the scale beam 12, as indicated at 16 and the fee chart, or schedule, for various classes of mail matter is generally indicated at 17, on the angularly formed front panel of the housing casting 10.

Referring to FIG. 2, the scale beam 12, in cross section, is substantially the form of an isosceles triangle, having a truncated apex. At its outer, or free end, the beam 12 is provided with a pin (not shown) which oscillates with the beam and within a suitable slot 18 in the scale housing 10 (FIG. 1). By the engagement of the pin within the slot 18, freedom of oscillation or rocking movement of the beam 12 is permitted with only a very slight lateral deviation possible from its normal plane of movement. Along its top surface the scale beam 12 is provided with a series of V-shaped notches 19 (FIGS. 1 and 3) disposed transversely of the beam and corresponding to each unit of weight indicated thereon.

The poise 15 normally rests upon the top surface of the scale beam 12 and in its zero indicating position abuts pin 20 secured on the beam. The V-shaped notches 19 are adapted to be engaged by an elongated indexing tooth 21 (FIGS. 2, 3 and 4) to removably retain the poise 15 in each adjusted position thereof on the scale beam 12. Indexing tooth 21 is integrally formed on one end of an indexing bar 22 having a T-shaped projection 23, integrally formed on its top surface and intermediate the ends of the bar 22, engaged in a similarly-shaped notch 24 in the upper flange of a supporting channel 25 of poise 15. The inner surface 30 of the web portion of channelled support bar 25 is angularly formed so that, upon emplacement of the poise 15 on scale beam 12, the surface 30 is spaced from and parallel to, the right-hand side of the scale beam 12, as seen in FIG. 2, such spacing being sufficient to permit freedom of movement of the poise 15 on the scale beam 12. The inner surface 31 of the lower flange 32 of channel support bar 25 is parallel to the lower surface of the scale beam 12 and is normally sufficiently spaced therefrom to permit removal of the indexing tooth 21 from a notch 19 for adjustment of the poise on the scale beam 12.

An extended portion 33 of the lower flange 32 (FIGS. 2 and 4) is of a reduced thickness, providing a ledge or shoulder upon which a face plate 34 is supported and secured in place thereon by any suitable means such as machine screw 35. In the assembled condition of the parts of the poise 15, the inner surface of face plate 34 lies in a plane parallel with the outer surface of the left-hand side of scale beam 12 (FIG. 2) and is sufficiently spaced therefrom to permit easy manipulation of the poise 15. An opening is provided within the face plate 34 having its lower wall in a substantially horizontal plane, and each of the side walls and top wall sloping angularly inwardly forming a viewing window 36. Upon adjustment of the poise 15, the weight of a given article may be viewed through window 36 and is visually indicated by means of an indented indexing mark 37 in the upper inclined wall of the face plate 34.

With each adjustment of the poise 15 on scale beam 12, the postage fee or charge for each indicated weight may be readily determined from the chart 17 by the relatively moved position of a pointer member. For this purpose, a bracket 40, having one end formed at a right angle is secured on the poise 15 by means of the screw 35. The other end of the bracket 40 extends laterally and is provided with a pointer projection 41 extending angularly downwardly through a suitable elongated slot 42 (FIG. 1) in the scale housing 10 for movement with poise 15. The angularity of the projection 41 is indentical to that of the face of the scale housing 10, so that the projection 41 moves in a plane parallel thereto upon adjustment of the poise 15.

In order to accurately counterbalance the scale under a no-load condition and with the poise 15 in the zero indicating position on scale beam 12, a measured plug 50 is secured with the counterbore 51 in the lower surface of the poise 15 (FIG. 2).

In weigh scales of the type shown, the value of postage to be applied is that indicated immediately to the left of the perpendicular edge 43 of the pointer projection 41 (FIG. 1). In the past, in the use of weigh scales of this type, particular attention had to be applied to the adjustment of the poise 15 to ensure accurate indexing of the poise by the full and complete seating of the indexing tooth 21 in the appropriate notch 19. If the indexing tooth 21 did not seat properly within the correponding notch 19, the poise 15 would be askew lengthwise of the scale beam 12. Even a slight askewness of the poise 15 caused pointer 41 to indicate an erroneous value, whether the poise be on the full-ounce graduation, or a fractional-ounce graduation on the scale beam 12. The longer the lateral extension of the bracket 40, the greater the error due to the necessary closeness of each indicated value to the adjacent values.

In order to ensure accurate seating of the indexing tooth 21 within an associated or corresponding notch 19, indexing bar 22 is provided with a pair of V-shaped guide teeth 44 and 45, spaced apart and integrally formed on indexing bar 22. The teeth 44 and 45 are adapted for sliding movement within a V-shaped groove 46 centrally positioned in the top surface of the scale beam 12 and extending lengthwise thereof. Thus, it can be seen that, as the indexing tooth 21 is lifted out of a notch 19, for adjustment of the poise 15, the tooth 45 serves to guide the poise in its travel along the scale beam. Upon resetting poise 15, tooth 44, together with tooth 45, serves to ensure accurate lengthwise alignment of the poise on scale beam 12, and thereby enable an accurate value indication on chart 17, in each adjusted position of the poise.

What is claimed is:
1. In a postal weight scale,
the combination of a housing including a value indicating chart supported thereon,
a platform for supporting a load to be weighed,
a scale beam bearing a series of unit weight registrations and operatively connected to said platform for rocking movement within said housing and in a plane parallel with said chart,
a poise freely supported for adjustment on said scale beam to counterbalance a load on said platform in accordance with a corresponding one of said unit weight registrations,
a pointer member supported by said poise and projecting laterally therefrom for movement with said poise in a path parallel to said chart on said housing for indicating a value on said chart upon each unit weight adjustment of said poise,
said scale beam having a V-shaped guideway along the upper surface extending lengthwise of the beam and a series of V-shaped notches disposed transversely of said guideway, one notch for each weight registration on said scale beam, and
an indexing bar mounted on said poise and having a pair of spaced V-shaped teeth engaging in said V-shaped guideway in said scale beam and a transversely disposed V-shaped index tooth adapted for engagement in said V-shaped notches in said scale beam in each adjusted position of said poise, whereby said poise is maintained nondisplaceable laterally in each adjusted position thereby limiting the indicating position of said pointer member to the value on said chart corresponding to the adjusted position of said poise.

References Cited

UNITED STATES PATENTS

| 953,321 | 3/1910 | Davenport | 177—44 X |
| 1,869,357 | 8/1932 | Fuller | 177—249 X |
| 2,582,485 | 1/1952 | Hem | 177—250 |
| 2,756,042 | 7/1956 | Kaeser et al. | 177—250 |
| 2,963,286 | 12/1960 | Fischer | 177—44 |

FOREIGN PATENTS 931,237   7/1963   Great Britain.

RICHARD B. WILKINSON, Primary Examiner

G. H. MILLER JR., Assistant Examiner

U.S. Cl. X.R.

177—250